US007762296B2

(12) United States Patent  
Ganz et al.

(10) Patent No.: US 7,762,296 B2
(45) Date of Patent: Jul. 27, 2010

(54) AGRICULTURAL VEHICLE TIRE

(75) Inventors: David Ganz, Belmont, MA (US); Alain Courtemanche, Drummondville (CA); Domenic E. Mazzola, Concord, MA (US); Steven Coetzee, Port Elizabeth (ZA); Tian Blomerus, Lowell, MA (US)

(73) Assignee: Alliance Tire Americas, Inc., Malden, MA (US)

(*) Notice: Subject to any disclaimer, the term of this patent is extended or adjusted under 35 U.S.C. 154(b) by 301 days.

(21) Appl. No.: 11/943,331

(22) Filed: Nov. 20, 2007

(65) Prior Publication Data

US 2008/0289737 A1 Nov. 27, 2008

Related U.S. Application Data

(60) Provisional application No. 60/867,168, filed on Nov. 24, 2006.

(51) Int. Cl.
*B60C 11/11* (2006.01)

(52) U.S. Cl. .............................. 152/209.1; 152/209.12; 152/209.18; 152/209.28; 152/902; 152/903

(58) Field of Classification Search ............. 152/209.1, 152/209.12, 209.18, 209.28, 902, 903; D12/544, D12/579
See application file for complete search history.

(56) References Cited

U.S. PATENT DOCUMENTS 1,211,958 A * 1/1917 Overman ................ 152/209.12
2,113,527 A * 4/1938 Hale ..................... 152/209.12

(Continued)

FOREIGN PATENT DOCUMENTS

AU 2004222777 * 10/2004

(Continued)

OTHER PUBLICATIONS

Galaxy Tire and Wheel Corporation, "Galaxy is the undisputed World Leader in skid tires", p. 4, vol. 103, Publisher: Galaxy Tire and Wheel Corporation, Published in: US, Feb. 2001.*

*Primary Examiner*—Steven D Maki
(74) *Attorney, Agent, or Firm*—William A. Loginov; Loginov & Associates, PLLC

(57) ABSTRACT

This invention provides a tire for agricultural vehicles that employs a tread design having a flattened contact surface across the width and a plurality of curved lugs that alternately extend from each sidewall to a location nearly adjacent to the opposing side wall. Each lug curves so that a central section at the center of the tire width is located on the surface ahead on the circumference of adjoining sections of the lug that extend toward each of the opposing sidewalls. In this manner, each lug appears to have a curved "banana" shape that extends across the width of the tire contact surface in a generally axial alignment. The grooves between lugs extend generally axially across the width, as a result. They are narrowed, having a circumferential width that is between approximately 20% and 30% of the average circumferential width of a lug. This geometry places more lug surface in contact with the road for better handling and longer tread life and provides less groove space to retain mud and detritus. This geometry also causes more accumulated mud and detritus to be squeezed from, and ejected out of, the tire prior to the transition onto hard road from soft ground, thereby reducing undesirable tracking on the road surface.

7 Claims, 16 Drawing Sheets

U.S. PATENT DOCUMENTS

| | | | |
|---|---|---|---|
| 3,559,714 A | * | 2/1971 | Verdier .................. 152/209.12 |
| 4,194,548 A | * | 3/1980 | Roger ................... 152/209.12 |
| 4,481,993 A | * | 11/1984 | Ohnishi ................ 152/209.12 |
| 4,649,976 A | * | 3/1987 | Cherveny et al. ...... 152/209.12 |
| 5,261,474 A | * | 11/1993 | Lobb et al. ................. 152/454 |
| 5,337,814 A | | 8/1994 | Bonko |
| 6,260,594 B1 | * | 7/2001 | Bonko et al. ........... 152/209.12 |
| 6,298,890 B1 | * | 10/2001 | Binsfeld ................ 152/209.12 |
| D477,808 S | * | 7/2003 | Bonko et al. ............... D12/544 |
| 6,748,988 B2 | * | 6/2004 | Nakamura ............. 152/209.12 |
| 2002/0092591 A1 | * | 7/2002 | Cortes ................... 152/209.18 |
| 2005/0133133 A1 | | 6/2005 | Becker et al. |

FOREIGN PATENT DOCUMENTS

| | | | |
|---|---|---|---|
| DE | 1213276 | * | 3/1966 |
| GB | 449017 | * | 6/1936 |
| JP | 55-036139 | * | 3/1980 |
| JP | 2001063317 | | 3/2001 |

* cited by examiner

AGRICULTURAL VEHICLE TIRE

FIELD OF THE INVENTION

This invention is related to tires and more particularly to tires employed on agricultural vehicles.

BACKGROUND OF THE INVENTION

Tires are an essential component on virtually all motorized and towed (freewheeling) vehicles. They are typically mounted on rims, and most are filled with pressurized air (or another gas) to maintain the tire's round shape under load. The pressure provides needed shock absorption upon contact with obstructions and allows the tire's contact surface to comply during turns for enhanced maneuverability. Tires are generally constructed from a durable elastomeric compound that applies significant friction to a confronting ground surface. This tire compound can include natural and/or synthetic rubber in a number of formulations that pored into a tire mold as a formable solid, and subsequently hardened and cured into the finished tire. The inner structure of the tire (between the inner and outer surface) is reinforced with plies of synthetic fiber, such as nylon that are laid in place at the outset of the molding process.

In the case of road tires, the radial design currently predominates. In radial tires the piles are oriented radially, being generally perpendicular to the bead (the portion which engages the rim and seals in pressurized air). The internal structure of the tread or contact face may also include steel belts for added durability. Bias-ply tires are often used in industrial and agricultural applications (e.g. loaders, construction vehicles, farm equipment, tractors, and the like), in which the alternating layers of plies cross each other, and each oriented at a non-perpendicular angle relative to the bead. The bias-ply design typically allows the tire to support greater loads for a given size, rendering it desirable for slower-moving and off-road industrial vehicles. Nevertheless, radial tire designs are becoming more-popular in certain industrial applications.

Tires designed for road-traveling vehicles, such as cars, trucks and trailers are designed with higher-speed performance and handling as a primary design parameter. Treads tend to be shallow and the surface area contacting the road tends to be a large proportion of the overall surface. Thus, the grooves surrounding the treads are fairly narrow and shallow. This type of tread design serves several purposes. It ensures that the contact surface is sufficiently large to provide sufficient frictional grip at high speeds and in sharp turns. This large contact surface also reduces tire wear and increases tire life at high speeds—the larger the contact surface area, the smaller the localized friction, and hence, the lower the wear. Because road-going tires generally encounter fairly smooth surfaces, without significant obstructions, the shallow tread is generally no detriment. Sometimes mud and snow impede their performance, but overall, this tread design is a reasonable tradeoff between high-speed performance and traction in adverse road conditions.

However, tires for use on industrial vehicles may spend virtually all of their operative time off-road, and often on very rough, wet and/or muddy surfaces. Typically, high-speed handling and performance are not concerns. Rather, tread designs for industrial tires mainly focus upon the width and size of grooves between tread lugs. The lugs are high, and often narrow, so as to provide an aggressive contact surface that maintains maximum traction, even in the wettest and most loosely-compacted terrain. In many cases, failure to maintain positive traction renders the vehicle useless in its task—for example, a bucket loader that must stand firm while driving the bucket into a mound. Of course, this tread design would lead to significantly higher wear rates and lower stability at high speeds due to the reduced road-contact area of the lugs. In most instances the aggressive tread profile is not detrimental to the vehicle's function, as such vehicles rarely take to the highway, and/or when they do, it is at very low speeds and/or for short distances.

The changing economics of farming create a significant exception to this general tread-design rule. In the U.S., and worldwide, many small-to-midsize farm properties are being consolidated under a single owner operator of farm equipment. Often these properties are non-contiguous and somewhat geographically remote from each other, being separated by hundreds of yards, or even hundreds of miles. The small size of individual farm parcels makes the use of separate equipment for each parcel uneconomical. Rather, the farmer is motivated to transport his or her equipment between non-contiguous parcels as needed. Such transport occurs over public roads that adjoin and connect the parcels.

Some equipment is simply carried on roadworthy trailers and trucks. Other equipment, owing to its size and weight, must be transported in direct contact with the road. FIGS. 1 and 2 detail one such equipment type. In this example, a manure-spreading trailer 100 (sometimes termed in the industry as a "honey wagon"), towed by a conventional, heavy-duty tractor 210, is shown transitioning from the farm field 212, where it has deposited liquid manure to a county road 214 that adjoins the field. The tractor 210 and hitched trailer 100 are being transported to a non-contiguous field or other location via the county road 214. The trailer 100 in this example is a conventional Model EL48-8D spreader available from J. Houle & Fils Inc. of Drummondville, Quebec, Canada. This trailer includes a liquid manure tank 110. It supports its heavy load on eight large independently steered wheels 120, each carrying a tubeless, pneumatic tire 130. The exemplary tire is a size 28L×26 ANS model, with an R-3 type lug tread, available form Bridgestone-Firestone of Nashville, Tenn. This tire is characterized by a relatively curved contact surface and a fairly conventional cloverleaf-style tread pattern in which a tessellated geometry of diamond-like lugs are separated by adjoining grooves.

The prior art tire has a tendency to accumulate a large volume of accreted mud, biomass and other soft detritus 140. This is because the profile of the contact surface 150 is curved, and the grooves 152 (see inset FIG. 1A) between tread lugs 154 are isolated from each other, giving mud, etc., no path to escape. As shown in detail in FIG. 2, this accumulation tends to follow the tire as it transitions onto the solid road surface 214, where it is then ejected in tracks 230 that clutter the road. As a matter of good citizenship, and often as a matter of law, the operator 240 must stop to clean all the ejected detritus from the road 214, expending time, energy and placing the operator at risk to be struck by a passing vehicle (250). In addition, once the road 214 is cleaned, the trailer 100 will make its trip on tires that are not well-suited to a hard road surface, as they are particularly adapted to field use. Given the high degree of contact surface curvature, and aggressive tread, the prior art tires wear quickly, particularly when driven on hard road surfaces at speed. In addition, their handling is unsuited to higher speed driving. In cases where the trailer is to be driven long distances, it may be connected to a conventional truck and driven at such higher speeds-up to, and including, highway speeds.

Notably, where the farm vehicle is a freewheeling, towed unit, the tires need not exhibit an extraordinary degree of traction. Rather, their primary function is to support the vehicle and maintain it in a straight line as it is towed around the field. Many other forms of self-propelled agricultural equipment, including combines, threshers and harvesters can also operate effectively with tires having a less aggressive tread due to their weight and overall footprint. Accordingly, it is highly desirable to provide an improved tire for use in such vehicles that reduces the accretion of mud and other detritus, provides improved handling on hard roads and exhibits increased wear resistance.

SUMMARY OF THE INVENTION

This invention overcomes the disadvantages of the prior art by providing a tire for agricultural vehicles that employs a tread design having a flattened contact surface across the width and a plurality of curved lugs that alternately extend from each sidewall to a location nearly adjacent to the opposing side wall. Each lug curves so that a central section at the center of the tire width is located on the surface ahead on the circumference of adjoining sections of the lug that extend toward each of the opposing sidewalls. In this manner, each lug appears to have a curved "banana" shape that extends across the width of the tire contact surface in a generally axial alignment. The grooves between lugs extend generally axially across the width, as a result. The grooves are relatively narrow, having a circumferential width that is between approximately 30-30% of the average circumferential width of a lug (and an overall a solid-to-void ratio of between about 1.25:1 to 2.25:1), and approximately 1.5:1 in the illustrative tire. This geometry places significantly more lug surface in contact with the road for better handling and longer tread life and provides less groove space to retain mud and detritus. This geometry also causes more accumulated mud and detritus to be squeezed from, and ejected out of, the tire prior to the transition onto hard road from soft ground, thereby reducing undesirable tracking on the road surface.

BRIEF DESCRIPTION OF THE DRAWINGS

The invention description below refers to the accompanying drawings, of which.

DETAILED DESCRIPTION

Figures 1, 1A:
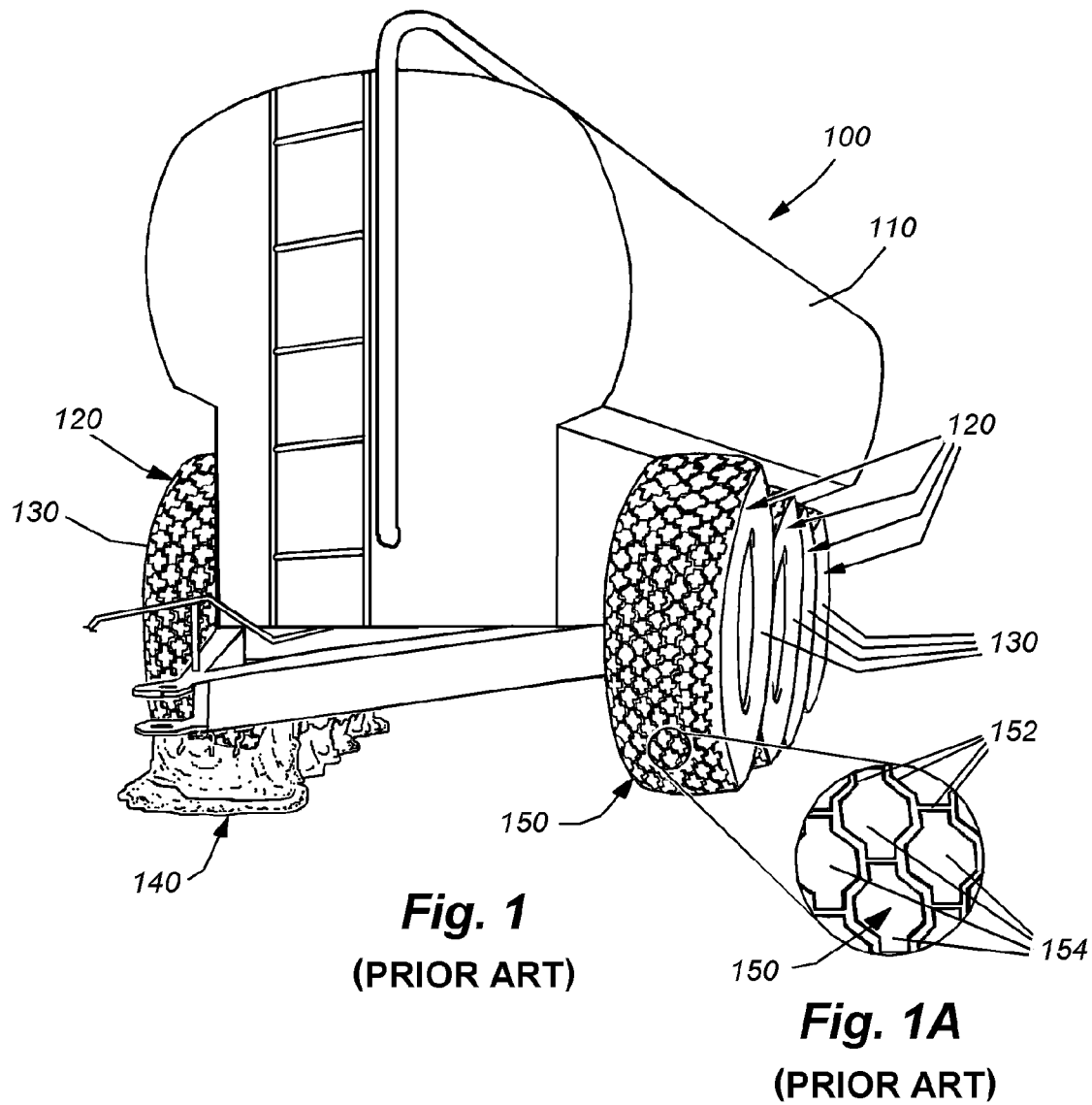
FIG. 1, already described, is a perspective view of an exemplary agricultural, towed vehicle having wheels with tires according to the prior art.
FIG. 1A, already described, is a more-detailed fragmentary view of the prior art tread pattern of FIG. 1.
Figure 2:
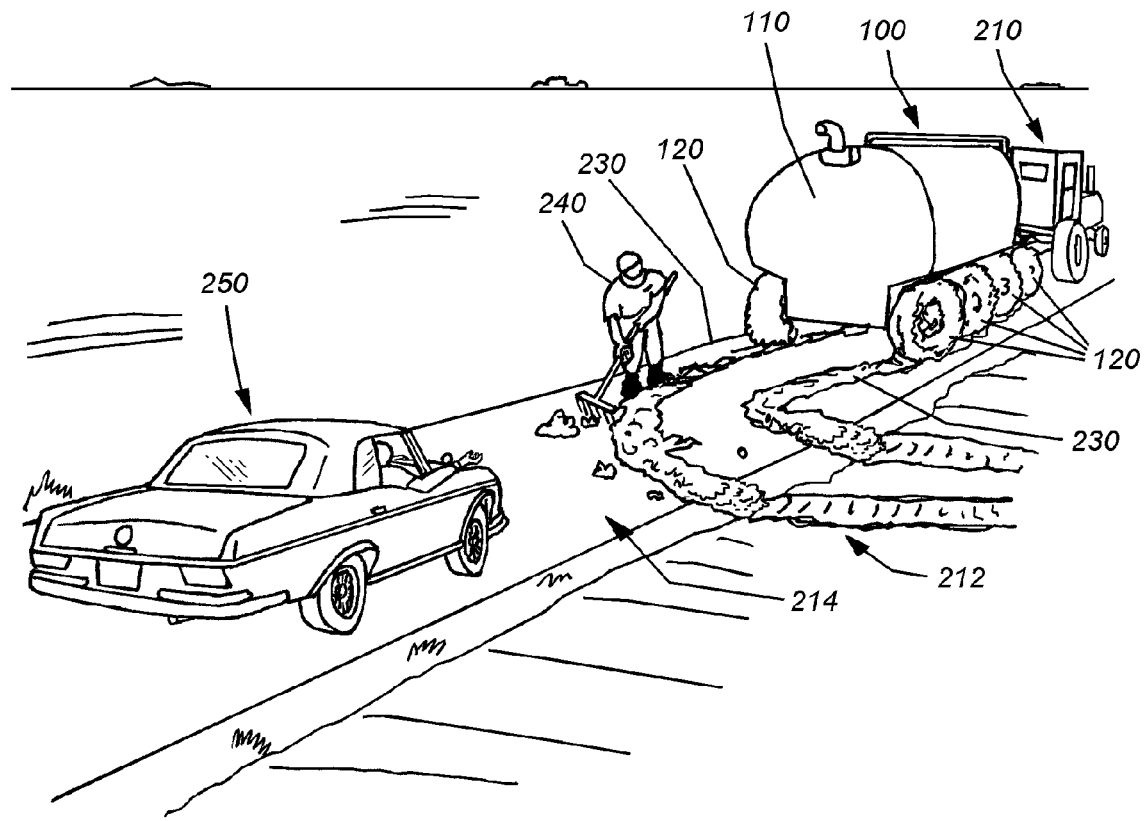
FIG. 2, already described, is a perspective view of the towed vehicle of FIG. 1 showing the disadvantages of its tires according to the prior art.
Figure 3:
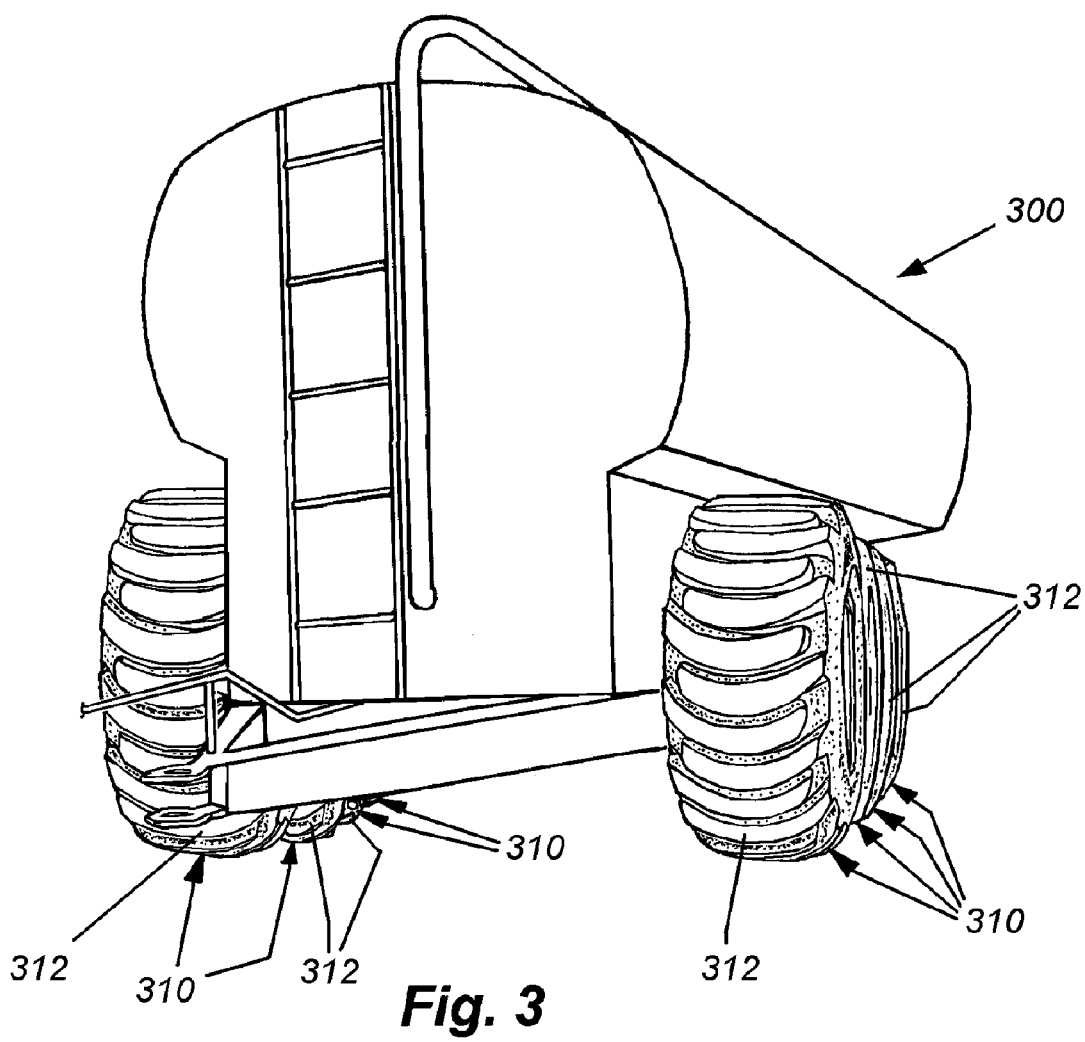
FIG. 3 is a perspective view of an exemplary agricultural, towed vehicle having wheels with tires according to an illustrative embodiment of this invention.

FIG. 3 details an exemplary agricultural vehicle 300, which, in this embodiment is the above described Houle liquid manure spreader, Model EL48-8D (or earlier similar type). This spreader, when fully loaded with 9500 gallons of liquid, has a static weight of over 98,000 pounds. This is divided among the eight wheels 310 to average over 12,500 pounds per wheel. The wheels each carry a tire 312 in accordance with an illustrative embodiment of this invention. It should be noted that the vehicle 300 is exemplary only, and as will be discussed below, the tire of this invention can be adapted for use on a wide range of vehicles used in agriculture and other activities in which transition from soft ground to hard road is contemplated.

Figure 4:
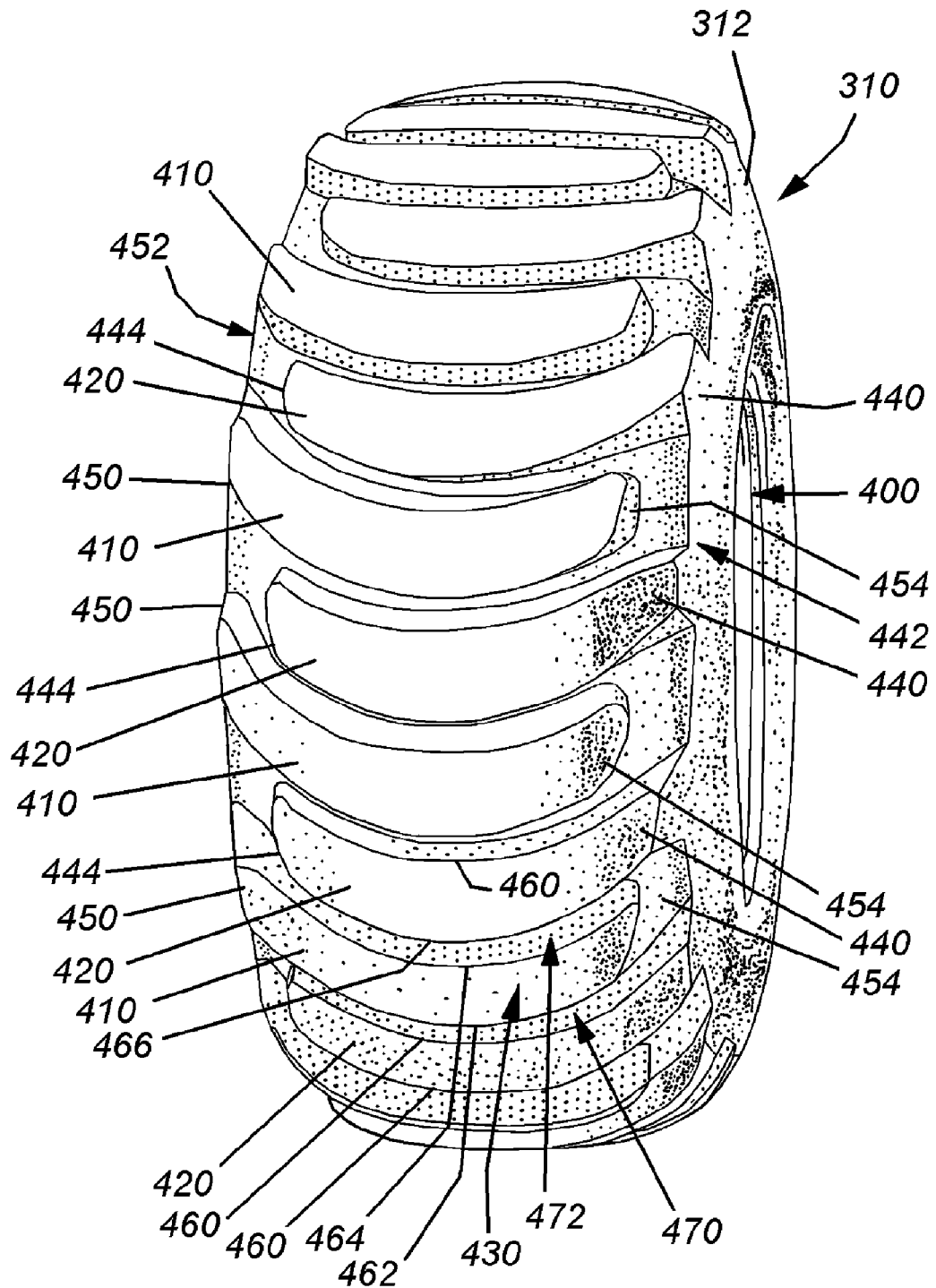
FIG. 4 is a perspective view of an agricultural vehicle tire according to an illustrative embodiment.
Figure 5:
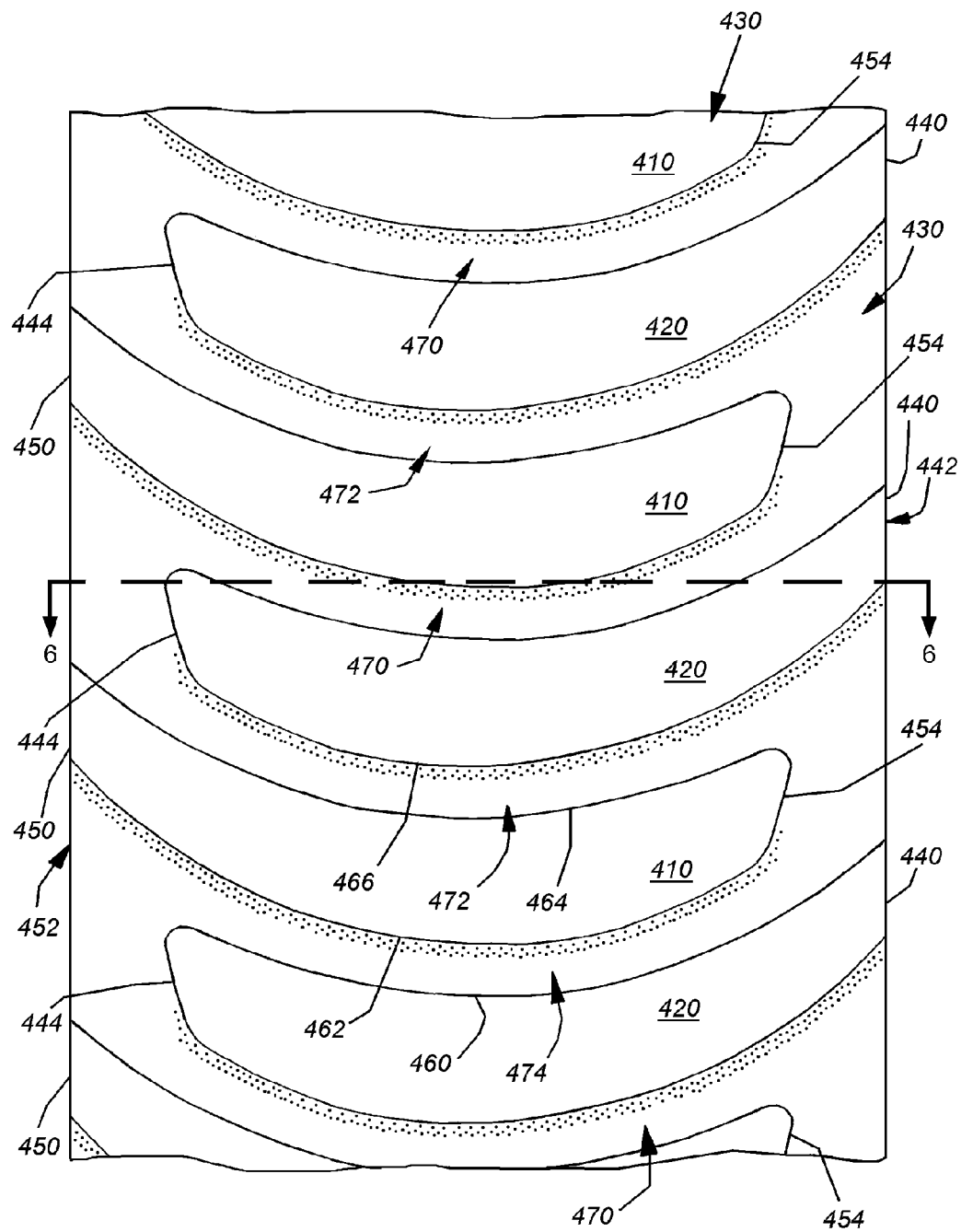
FIG. 5 is a plan view the tread pattern for a circumferential segment of the tire of FIG. 4.

The wheel 310 and inventive tire 312 are illustrated in further detail in FIG. 4. The tire 312 is mounted on a conventional rim 400 in this example. The tires unique tread design consists of a plurality of left-extending lugs 410 and right-extending lugs 420 (these directions being arbitrary herein) that alternate, and surround the circumference of the tire 312—thereby defining the tire's overall contact surface 430. Reference is also made to the tread plan view of FIG. 5. Each of the left-extending lugs 420 extend substantially from a right lug side edge 440 on the right sidewall 442 (as depicted) to an opposing lug end 444 near the left sidewall 452. Right-extending lugs 410 are interposed between pairs of left-extending lugs 420, and extend substantially from a left lug side edge 450 at the left sidewall 452 to an opposing lug end 454 near the right sidewall. Each of the lugs defines a pair of curved edges that extend in a general axial direction across the tire's width—edges 460, 466 (for left extending lugs 420) and edges 462, 464 (for right-extending lugs 410). The edges of adjacent lugs 410, 420 define the alternating curved grooves 470 and 472. The grooves 470 and 472 are continuous across the tire width, being free of any breaks or obstructions therein. As will be discussed below, these continuous, curved grooves aid in the reduction of accumulated mud/detritus on the tire surface. The grooves 470, 472 also aid in the rapid ejection of any accumulated mud/detritus that becomes lodged in the grooves 470, 472. In this illustrative embodiment, the general solid-to-void ratio between lugs and grooves is approximately 1.5:1. It is contemplated that this ratio can vary between approximately 1.25 to 2.25:1 in alternate embodiments. This ratio ensures a large degree of contact between tire material and the ground, thereby increasing road-traction and reducing wear. Nevertheless, a significant groove for use in soft earth is still provided.

Figure 6:
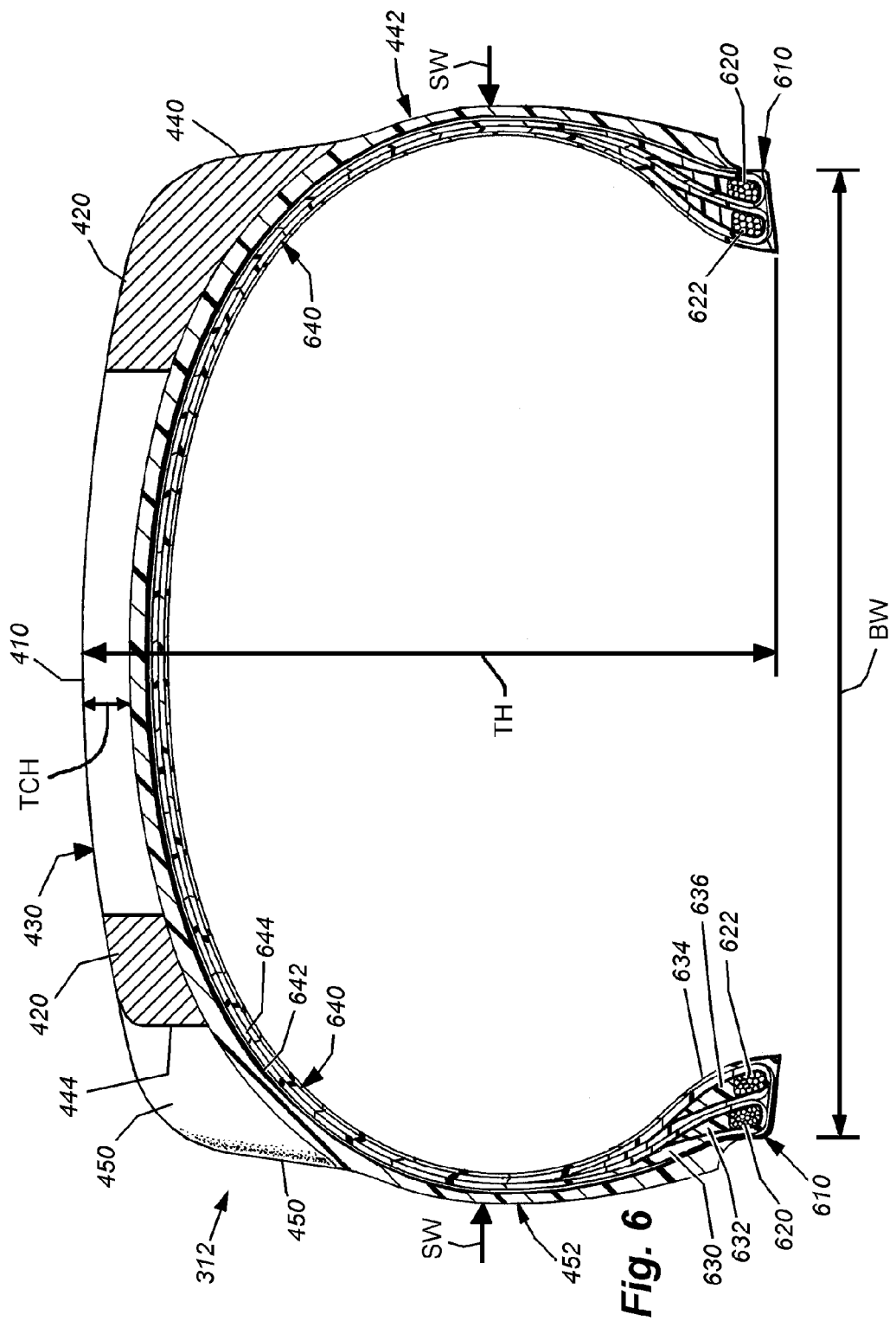
FIG. 6 is a radial cross section of the tire of FIG. 4, taken along line 6-6 of FIG. 5, detailing generally the construction of the walls and piles therein.

The illustrative tire's (312) radial cross section is shown in FIG. 6. The exemplary tire is sized 725/65×26 (e.g. 65-inch overall diameter) and 26-inch rim diameter). The aspect ratio is approximately 60, but can vary in a range between approximately 50-70. The central groove depth TCH between the top of each lug and groove bottom is approximately 34/32 to 38/32 inch (1 1/16-1 3/16 inch) in an unworn state. The contact surface exhibits some curvature, but is adapted to flatten to a nearly flat surface under specified static loading (more than 12,000 pounds in the above-example). In one example the molded curvature of lugs is such that the center of each lug is located an inch or less higher (radially) than the lug's sidewall edge. This profile places significant contact surface area in continuous engagement with the ground relative to conventional agricultural tires. It has been found such a profile exhibits a significant increase in tire life. In tests, the initial wear approximated 1/32 inch per 168 hours of tire use. These initial results involved tires that were inflated to less than the specified 45 PSI This rate appears to slow after the initial 1/32 inch of wear due to the increase in tread surface as the sloped grooves narrow and lugs widen as a result of wear (refer to the section views of groove slope in FIGS. 12-17 below). On a straight-line basis, this wear characteristic translates to a life for the illustrative tire in the range of approximately 2,000-2500 hours, compared with approximately 750-1500 hours for conventional agricultural tires. Due to the observed slowing of the illustrative tire's wear, and by providing proper inflation, the predicted life of 2000-2500 hours may be multiplied.

Referring further to the cross section of FIG. 6, the illustrative tire exhibits a radial height TH of approximately 18 inches. The tire radius has been measured to deflect up to approximately 4 inches under full static load. The maximum SW width between sidewalls is approximately 29 inches. The width BW at the bead 610 is approximately 25 inches. The relative curvature of the tire's sidewalls is highly variable as is the wall thickness at various locations. The thickness at any location is typically chosen to optimize strength versus weight. By way of example, the relative thickness of tire wall areas can be generally in conformance with the cross section of FIG. 6. It should be clear all dimensions stated herein are exemplary. The actual tire dimensions can be scaled appropriately for a given size rim and static load. According to an embodiment of this invention, the ratios between dimensions provided herein can be maintained, and a tire can be produced in accordance with these ratios in the desired rim size. It is also expressly contemplated that variations on these ratios can be employed where appropriate to adapt a tire to a specific diameter and width of rim without departing from the teachings of this invention. In general, the general tread design and the approximate ratio of lug surface area to groove area should be approximately maintained in all versions of the design to achieve the desired performance and wear characteristics.

The cross section of FIG. 6 reveals a pair of circumferential bead reinforcements 620, 622 that are conventional, and typically constructed from steel wire. They are surrounded by woven plies 630, 632, 634 and 636 of conventional nylon (or another fiber) that converge in the sidewall 442, 452, and extend together through the inner tread surface 640. Additional capping plies 642 and 644 can be applied along the inner tread surface to further reinforce this area. Although the precise number and arrangement of plies is highly variable, the tire 312 can contain a total of twenty plies in an illustrative embodiment. The illustrative tire's plies are arranged in a bias-ply arrangement in this embodiment. However, in alternate embodiments, the plies can be arranged in a radial (or other) arrangement.

The formulation of the compound from which the tire 312 is constructed is highly variable. In an illustrative embodiment, it is contemplated that the compound is selected from a group of formulations that are commonly used in the construction of heavy equipment tires. Such compounds are within the knowledge of those of ordinary skill in the construction and molding of tires. The compound can be chosen to particularly optimize strength and performance under the expected static loading conditions to which the tire is subjected.

Figure 7:
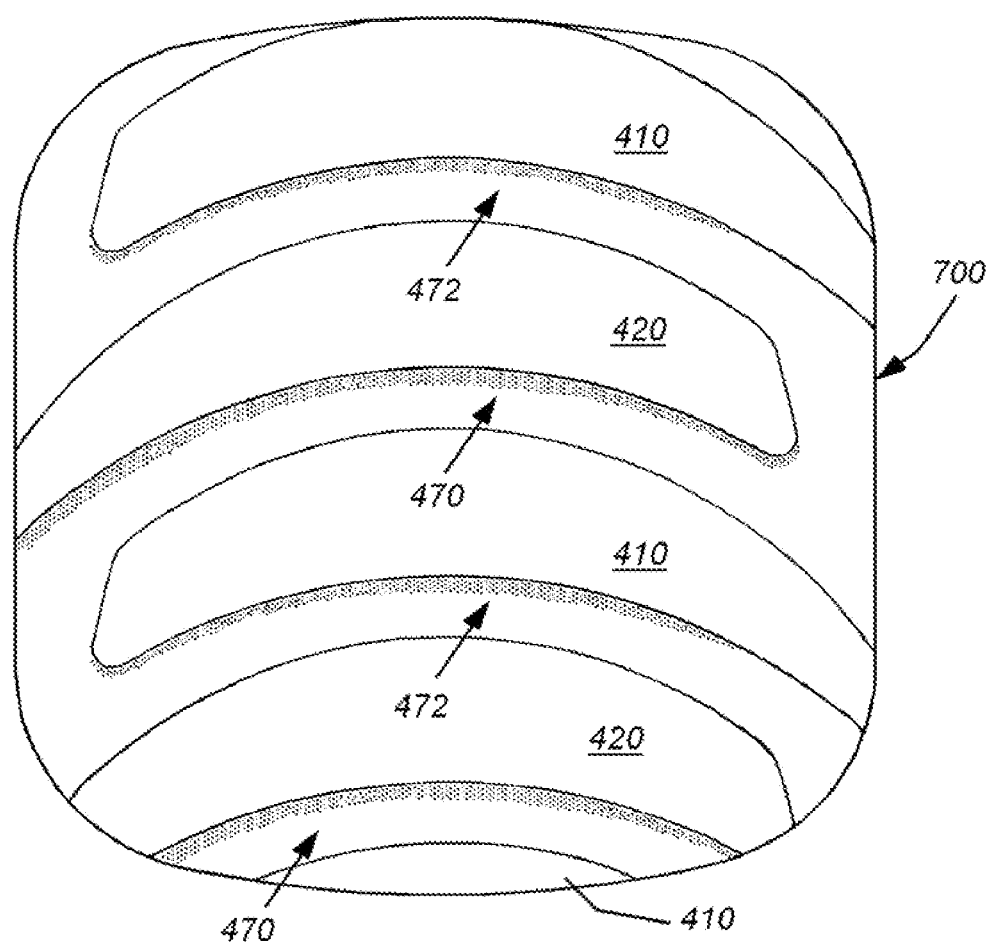
FIG. 7 is a plan view of an exemplary contact-surface footprint for the tire of FIG. 4.

Referring briefly to FIG. 7, the illustrative tire's exemplary "footprint on a packed or hard ground surface is shown. This footprint encompasses nearly 4½ complete lugs 410, 420. Since the illustrative tire includes 34 individual lugs (17 per side or 17 alternating pairs) about its circumference, this is approximately 13% of the tire's total contact surface. As shown the relatively large solid-to-void ratio (given the narrowed grooves 470, 472) ensures a sizable contact area on the road at any time, which provides the desired improved road handling and reduced mud/detritus accumulation.

Figure 8:
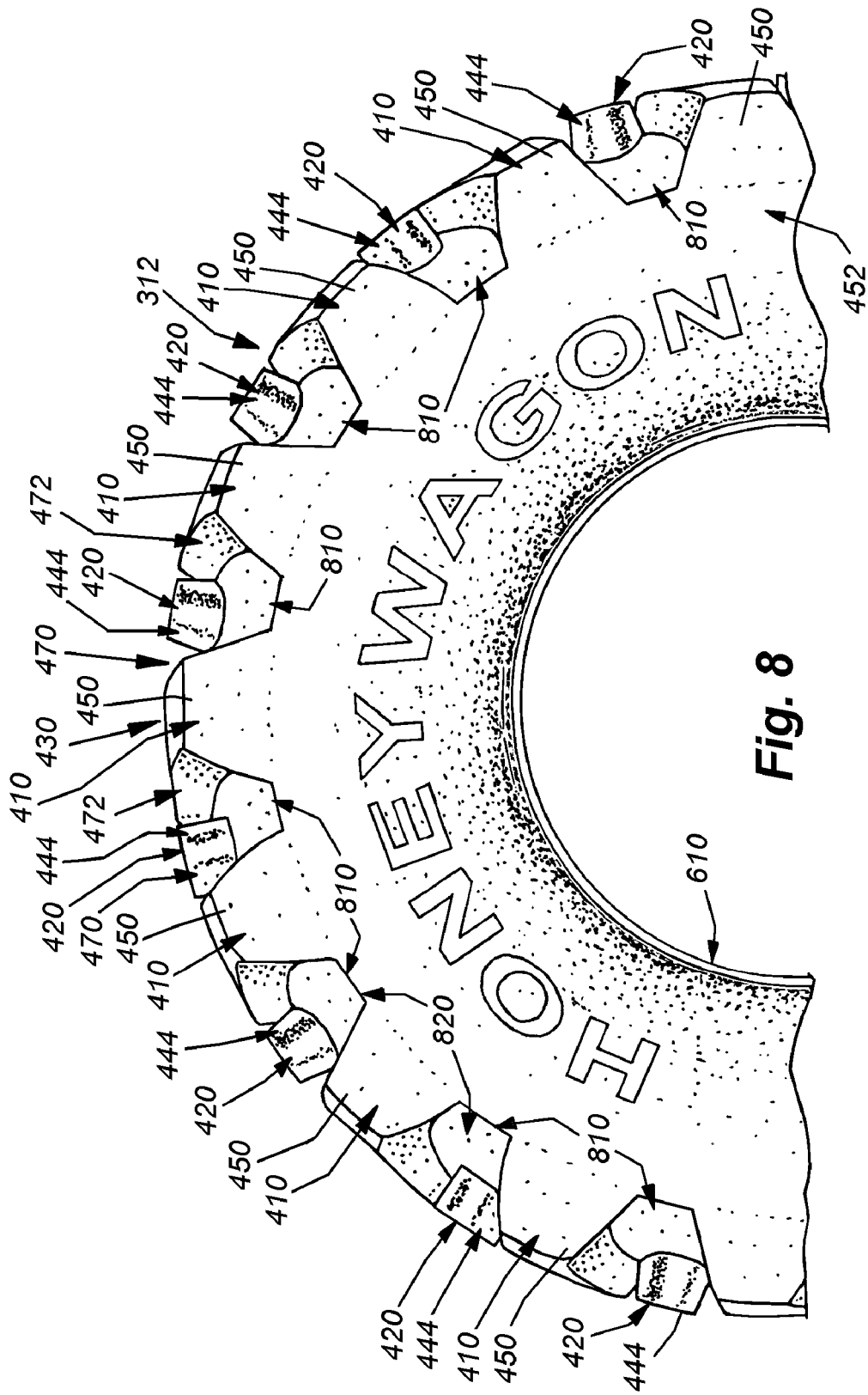
FIG. 8 is a partial exterior side view of the tire of FIG. 4.

The illustrative tire 312 is shown in partial side view in FIG. 8. The side edges 450 of lugs 410 are shown as extensions of the side wall 452. The alternating lugs 420 terminate at ends 444 before the sidewall 452. Note that the opposite side appears the same, with lugs 420 extending from the opposing sidewall 442 and terminating before the sidewall 452. The void 810 between lug ends 444 and the sidewall 452 is generally bounded by the tread wall 820, the angled sides of the alternating lugs 410 and the truncated end 444 of each lug 420. Note that the opposing void is formed by the walls of lugs 420 and the end 454 of lugs 410. The voids 810 increase traction on soft ground while allowing for a fairly long lug so as to increase contact surface area and improve road performance. The voids 810 are located on the ends of lugs so that they are interconnected with the adjacent grooves 470, 472 between lugs. The path between grooves 470, 472 and lugs is relatively smooth and free of obstructions or blockages. As described below this provides a free flow of soft material between the grooves and the voids for better ejection.

Figure 9:
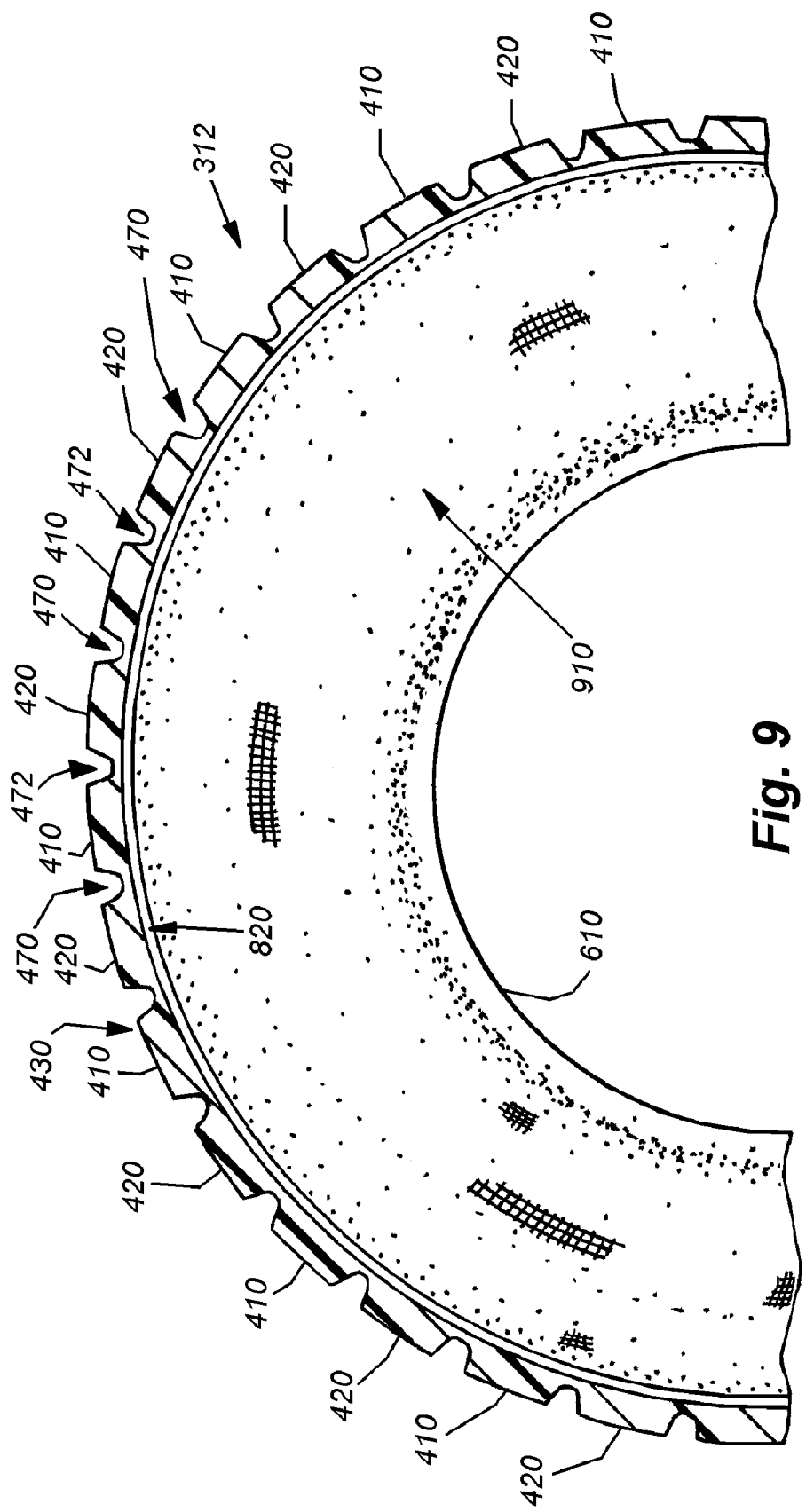
FIG. 9 is a partial internal circumferential side cross section of the tire of FIG. 4.

Referring briefly to FIG. 9, the illustrative tire 312 is shown in partial circumferential cross section. This section is taken approximately through the equatorial plane of the tire, perpendicular to the rotational axis. This illustration reveals the profile at the center of the tire's axial width. As shown, the lugs 410, 420 are approximately equal in cross sectional dimension at this point. The grooves 470, 472 are likewise, approximately equal and symmetrical. The relative angles of grooves and lug sides at various locations along the tire 312 is described in detail below (FIGS. 12-17).

Figure 10:
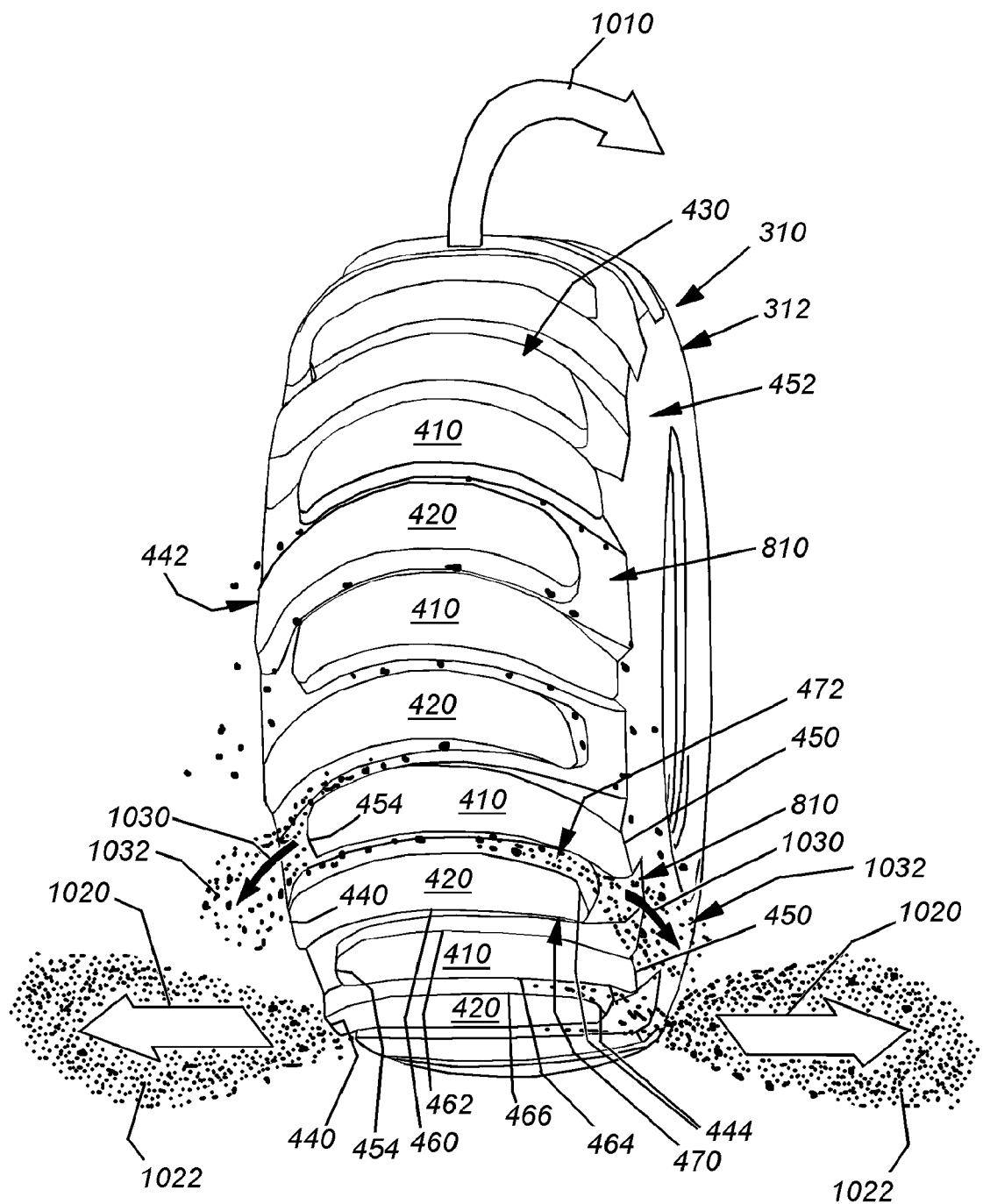
FIG. 10 is a perspective view of the tire of FIG. 4 showing its desirable mud-ejection properties.

Referring now to FIG. 10, the illustrative tire is shown rotating (arrow 1010) in a direction of forward motion with the trailing side facing forward. The lugs 410, 412 are shaped like a series of interleaved "bananas" having a widthwise center that is circumferentially forward of each outer end. By "interleaved" or "alternating" it is meant that adjacent lugs each extend from opposing side walls to a point inset from that sidewall. The lugs each define a pair of lateral edges 460, 462, 464 and 466 that are curved somewhat continuously. The unbroken curve provides the grooves 470, 472 between each lug with a clear path to discharge and eject (arrows 1020) mud and detritus 1022 as the footprint compresses the ground. Hence the accumulated mud/detritus is not retained within the thread grooves as in prior art implementations. Nevertheless, the curve provides lateral/axial stability to the tire as it rolls. A straight groove might allow the tire to slide laterally/axially. Rather, the depicted "banana" groove provides a keel that assists in maintaining the tire's straight track in soft or wet material.

In addition, the relatively narrow, unbroken grooves 470, 472, with steeply angled sides (see below) limit accumulation of mud/detritus and facilitate ejection (arrows 1030) of material 1032 as a tire section rises out of contact with the ground. As such, much less material is maintained between grooves as the tire transitions from soft ground onto a road surface. This minimizes or effectively eliminates the undesirable tracking of mud/detritus on the road.

The tire 312, as shown in FIG. 10, is oriented so that the opposing ends of each lug circumferentially trail the lug center as the tire rises from the contacted ground. As such, this facilitates ejection (arrows 1032) of mud/detritus from the grooves both by gravity and by centrifugal force, due to tire rotation.

Figure 11:
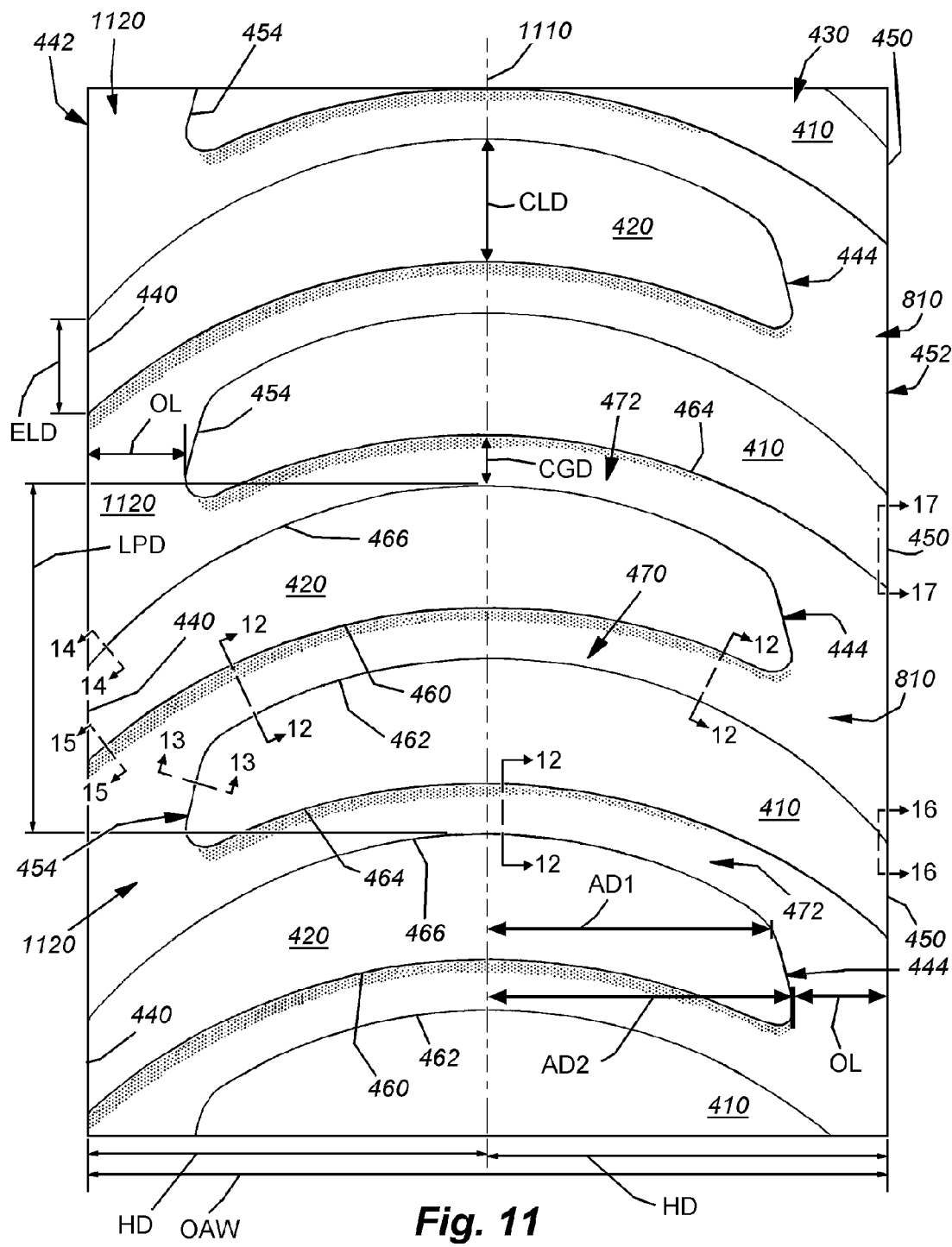
FIG. 11 is a plan view of the tread pattern in accordance with FIG. 5 denoting various tread sections.
Figure 12:
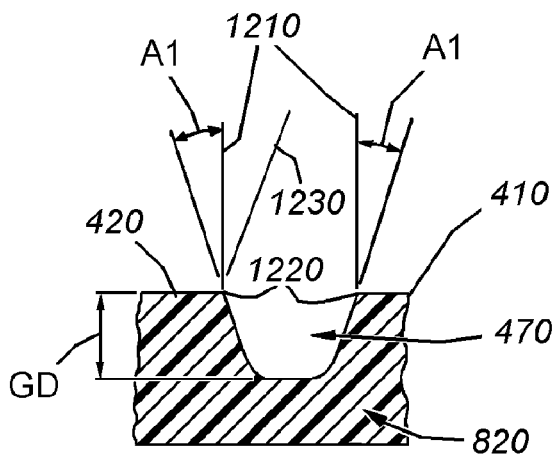
FIGS. 12-17 are each partial cross sections of the tread sections, taken respectively along lines 12-12 to 17-17 of FIG. 11.
Figure 13:
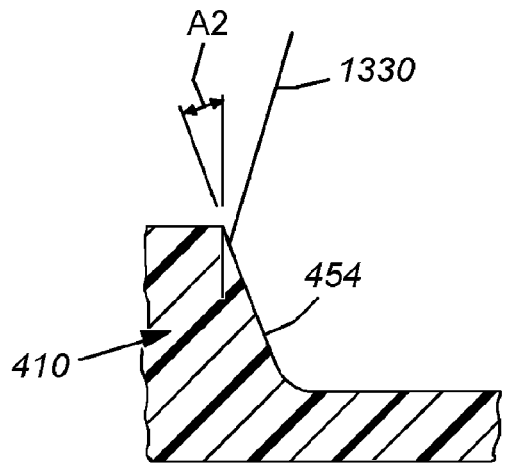
Figure 14:
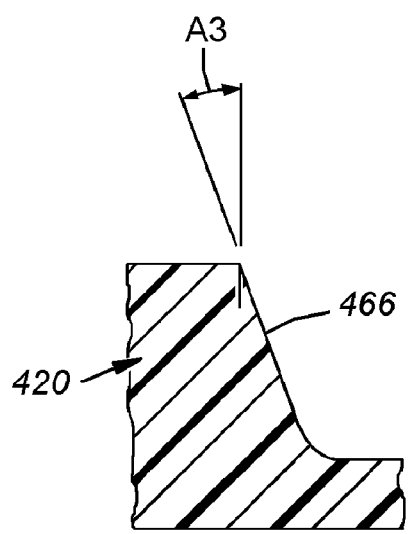
Figure 15:
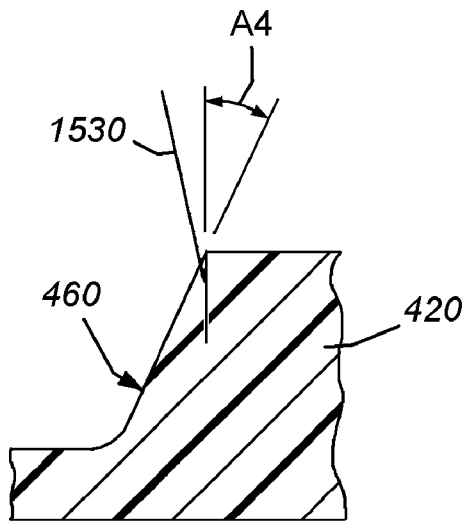
Figure 16:
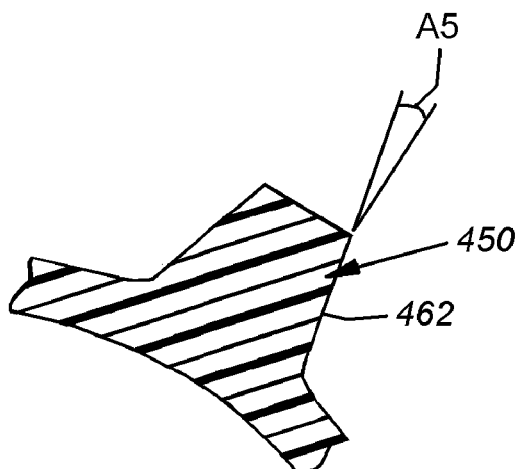
Figure 17:
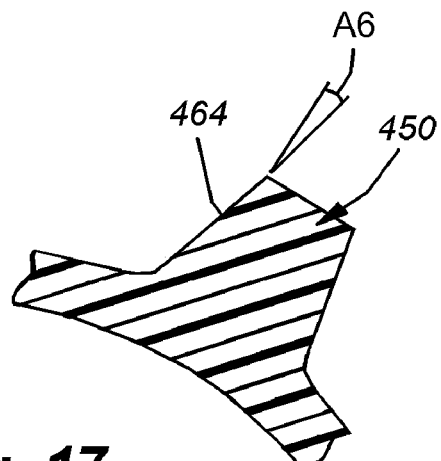

The contact surface 430 of the illustrative tire 312 is shown in plan view (flattened) further in FIG. 11. The equatorial center line 1110 divides the tire and tread pattern symmetrically. The overall width (OAW) of the contact surface 430 is approximately 25½ inches, and the widthwise/axial distance HD between each edge and the centerline 1110 is approximately 12¾ inches. For the illustrative tire, the total circumferential distance LPD between lug pairs (lugs 410 and 420) is approximately 11⅜ inches. The centerline circumferential distance CLD for each lug (at the top, when unworn) 420 is approximately 4 inches. Likewise, each lugs side edge (440, 450) has an unworn top circumferential distance ELD of approximately 3⅛ inches. Each groove 470, 472 has an unworn centerline top distance CGD of approximately 1⅝ inches. This groove width is largely unchanged along the majority of lateral (axial) distance between confronting lugs 410, 420. As described above, the opposing, inset lug ends 444 and 454 terminate before the adjacent sidewall 442 and 452, respectively thereby defining end voids 810 and 1120, respectively. The degree of axial inset of the lug ends 444, 454 is highly variable. In this embodiment, the minimum offset OL of each lug end 444, 454 from the adjacent sidewall 442, 452, respectively is approximately 2¾ inches or approximately 10% of the total length of axial lug extension across the surface width. Typically the lug extends approximately 92 to 85% of the total axial contact surface width in this embodiment. However, other values for the degree of lug extension falling outside this range are expressly contemplated.

Note that the inset lug ends 444, 454 are angled with respect to the adjacent sidewall 442 and 452, respectively. The angling of the ends is optional, but assists in ejection of material by providing a smoother transition from the upper groove at this shortened lug end. The degree of angle is highly variable. In this embodiment, the angle is defined by the depicted measurements AD1 and AD2 from intersecting points between the angled edge 444 and the lug edges 460, 466 to the centerline 1110. In the illustrative tire the distance AD1 is approximately 8¾ inches and the distance AD2 is approximately 10 inches.

The illustration of the contact surface 430 in FIG. 11 also contains a plurality of section details relating to specific locations on the surface and the relative profile of the localized cross section at each location. Each line 12-12 refers to a groove profile (groove 470 or 472), which is shown in its cross section FIG. 12. The groove walls, along most of the groove's lateral width, is relatively steep, exhibiting an angle A1 on both sides of approximately 18 degrees. Note that this angle A1 is measured with respect to a line 1210 that is normal to the tire surface (its tangent) at the corner 1220 of the groove and lug. The steep groove angle of 18 degrees reduces buildup of material and facilitates ejection. As noted above the unworn groove depth GD for the illustrative tire at the centerline is between approximately ³⁴⁄₃₂ and ³⁸⁄₃₂ inches. Since the tread wall tends to curve more than the lug face, the grooves deepen in each outward direction from the centerline. For reference line 1230 is the tire's radial line, emanating from the central rotational axis The section at line 13-13 (FIG. 13) corresponds with the profile at each tapered, inset lug end 454 (and 454). Line 1330 is the radial line. The angle A2 is approximately 20 degrees. The section at line 14-14 (FIG. 14) corresponds to the profile of the upper lug edge 466 (and edge 462) near the sidewall 452 (and 442). The angle A3 is approximately 20 degrees. The section line 15-15 (FIG. 15) corresponds to the profile of the lower lug edge 460 (and edge 464) near the sidewall 452 (and 442). The angle A4 is approximately 25 degrees. Line 1530 is the radial line. The section line 16-16 corresponds to the profile of the upper edge 462 of lug sidewall edge 450 (and the upper edge 466 of lug sidewall edge 440). The angle A5 is approximately 20 degrees. Finally, the section line 17-17 corresponds to the profile of the lower edge 464 of lug sidewall edge 450 (and the lower edge 460 of lug sidewall edge 440). The angle A6 is approximately 25 degrees.

In summary, the above-described tire design affords an excellent tradeoff between handling on both soft and hard surfaces, minimal accretion of mud, detritus and other material, long life and sufficient traction for most applications. The unique "banana" lug tread design with alternating curved lugs that extend from sidewalls to an inset point short of the opposing side wall affords all of these desired characteristics. To this end, FIGS. 18-20 illustrate some (but not all) exemplary applications in which the tire in accordance with the teachings of this invention can be employed.

Figure 18:
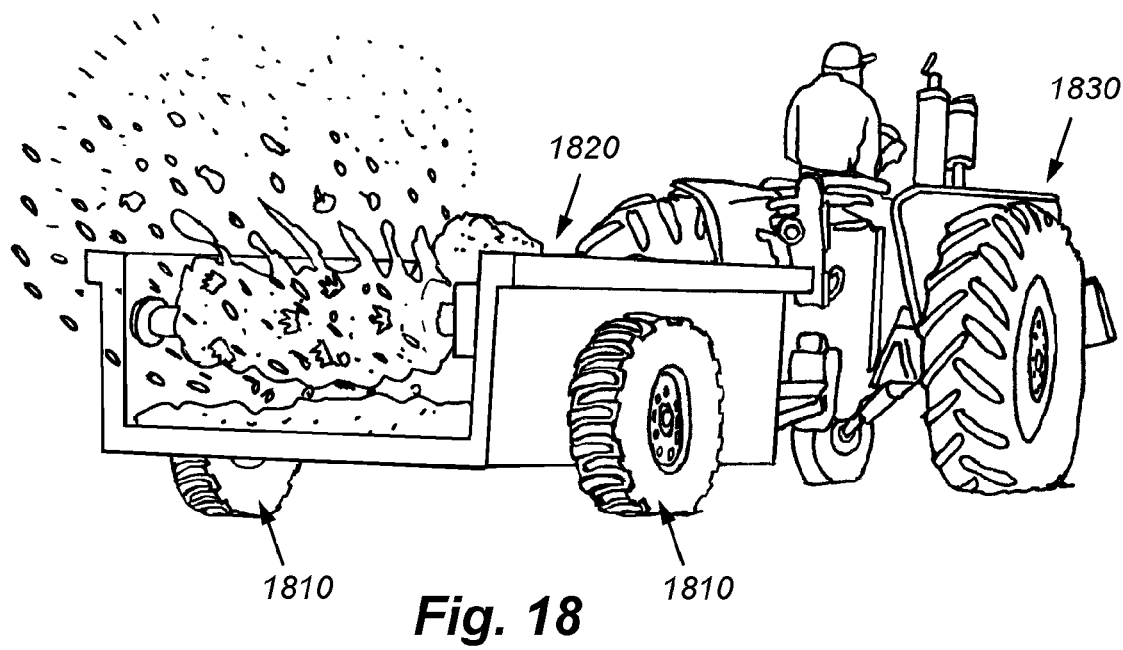
FIG. 18 is a perspective view of the application of a tire in accordance with an embodiment of this invention on an exemplary, smaller, towed agricultural vehicle.

In FIG. 18, a version of the inventive tire 1810 is sized to fit on a smaller towed agricultural vehicle 1820, being towed by an appropriately sized tractor 1830. The vehicle 1820 in this example is a manure spreader, but any trailer/towed vehicle that may be required to traverse road surfaces may benefit form the illustrative tire design.

Figure 19:
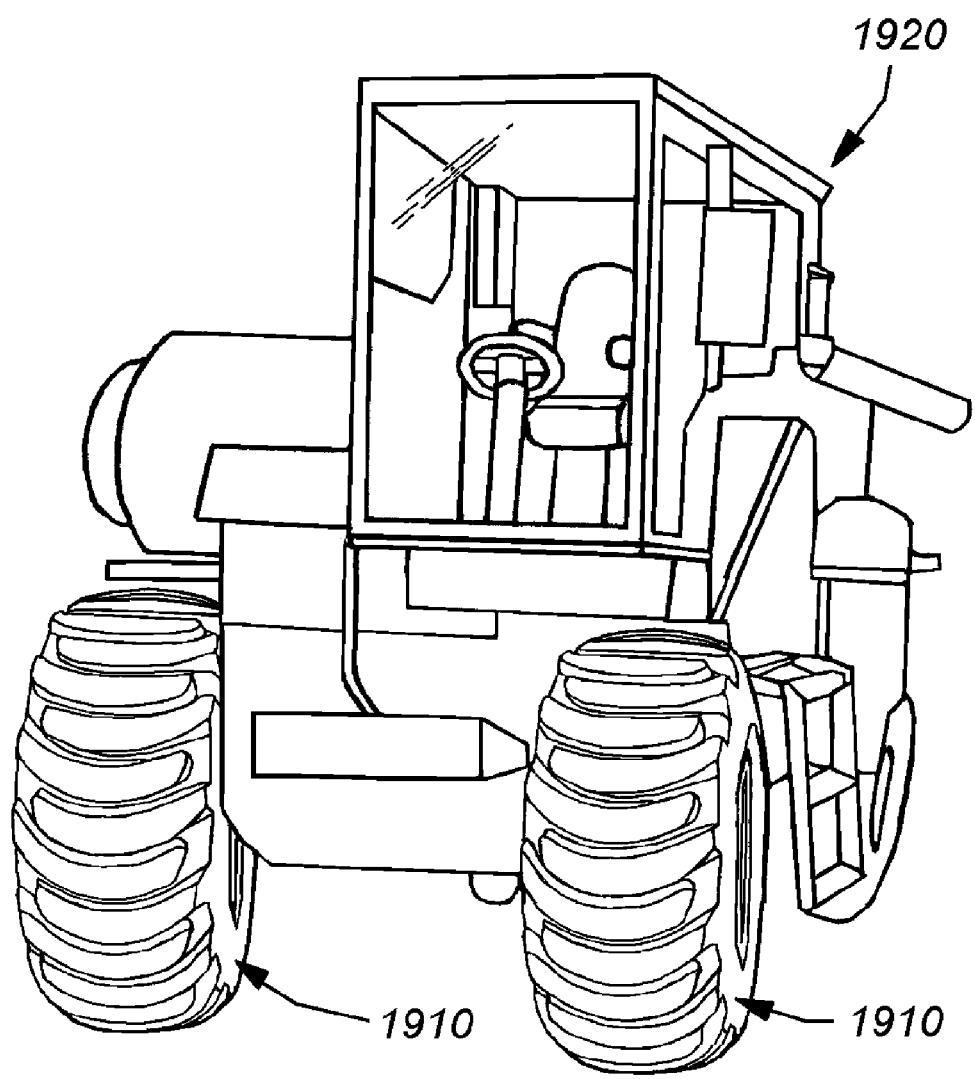
FIG. 19 is a perspective view of the application of a tire in accordance with an embodiment of this invention on an exemplary, self-propelled agricultural vehicle.
Figure 20:
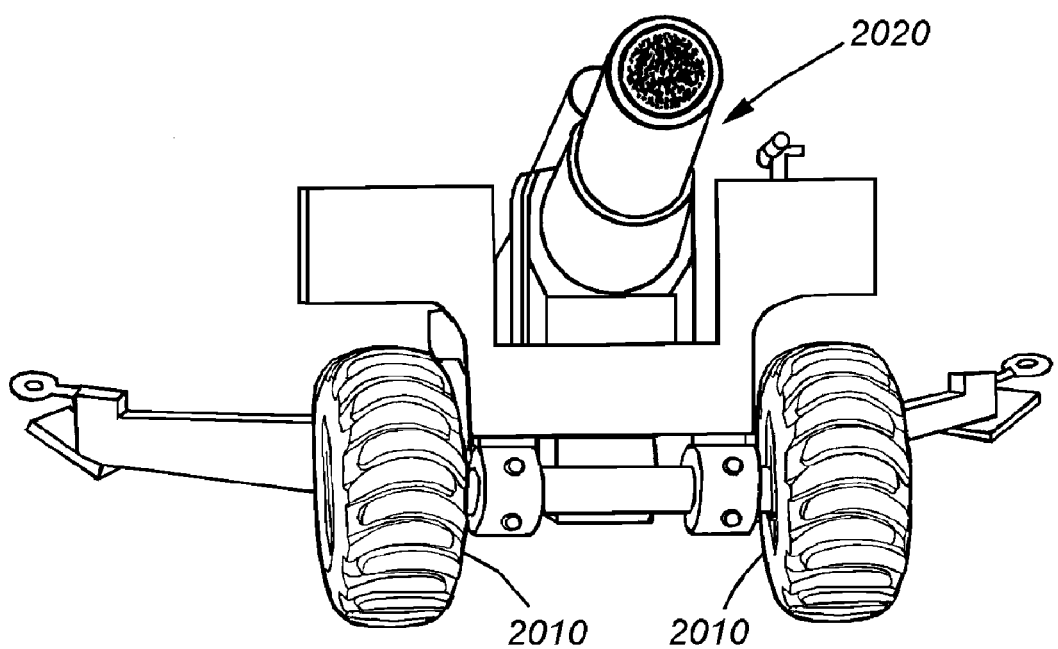
FIG. 20 is a perspective view of the application of a tire in accordance with an embodiment of this invention on an exemplary, towed piece of military equipment.

In FIG. 19, the tires 1910 of this invention are sized to fit a self-propelled agricultural vehicle 1920, such as a combine. In some applications, it may be preferred to change the direction of the curved lugs for best performance under self-propulsion. Note that a variety of self-propelled and towed vehicles can benefit from the tires of this invention. For example many equipment pieces employed in the lumber industry transition from road travel to field use.

Another class of equipment that can benefit from tires in accordance with the teachings of this invention is military hardware. Military vehicles regularly transition from the field to the road. Personnel must be concerned about the impact of their exercises on local populations. In addition, the long-distance movement of equipment over roads is quite common and long-wearing tires are a distinct advantage. In this example, a towed equipment piece 2020 is provided with appropriately sized tires 2010 in accordance with the teachings of this invention.

The foregoing has been a detailed description of illustrative embodiments of the invention. Various modifications and additions can be made without departing from the spirit and scope if this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, in alternate embodiments, the tire can be oriented to rotate in forward motion with the treads oriented in the opposite direction from that depicted. Additional grooves or other structures can also be applied to the tread in alternate embodiments that are not otherwise inconsistent with the desirable features described herein. Likewise, the sidewalls can be modified to include additional reinforcements, graphics or other structures. The ply construction is also highly variable. In addition the degree of curvature of the contact surface and/or lugs can be varied to adapt the design to a particular load, terrain or equipment type. Also, the lugs may be asymmetrical in curvature and/or placement so as to provide distinct left-sided and right-sided tires, unidirectional. Of course the size and dimensions provided herein are merely exemplary of a wide variety of sizes of tire to which the teachings of this invention are applicable. Accordingly, this description is meant to be taken only by way of example, and not to otherwise limit the scope of this invention.

What is claimed is:

1. An industrial tire for field and road use comprising: a contact surface having a plurality of interleaved continuous lugs with grooves therebetween, the lugs being continuously curved and the grooves being free of breaks and obstructions therealong; the lugs each extending axially from a first sidewall to a respective location inset from a second sidewall and adjacent lugs extending from the second sidewall to a respective location inset from the first sidewall; and wherein a solid-to-void ratio of the contact surface is in a range of approximately 1.25:1 to 2.25:1, each of the lugs extends between approximately 85 and 92 percent of an overall axial width of the contact surface, and each of the grooves defines a circumferential width that is between approximately 20% and 30% of an average circumferential width of each of the lugs.

2. The industrial tire of claim 1 wherein each of the lugs defines a wall that extends at an angle of between approximately 20 and 25 degrees with respect to a radial line of the tire.

3. The industrial tire as set forth in claim 1 wherein an inner bead of the tire is constructed and arranged to mount to a rim of a tractor-towed agricultural trailer.

4. In combination, an agricultural trailer and at least one industrial tire mounted on a rim of the agricultural vehicle, the tire further comprising: an inner bead mounted to the rim of the agricultural trailer; a contact surface having a plurality of interleaved continuous lugs with grooves therebetween, the lugs being continuously curved and the grooves being free of breaks and obstructions therealong; the lugs each extending axially from a first sidewall to a respective location inset from a second sidewall and adjacent lugs extending from the second sidewall to a respective location inset from the first sidewall; and wherein each of the lugs extends between approximately 85 and 92 percent of an overall axial width of the contact surface, a solid-to-void ratio of the contact surface is in a range of approximately 1.25:1 to 2.25:1, and each of the grooves defines a circumferential width that is between approximately 20% and 30% of an average circumferential width of each of the lugs.

5. The agricultural trailer and the industrial tire as set forth in claim 4 wherein the agricultural trailer comprises a tractor-towed liquid manure spreader.

6. The agricultural trailer and industrial tire as set forth in claim 4 wherein each of the lugs is oriented with ends thereof directed downwardly on a rear-facing side of the tire opposite a front facing end in a direction toward a trailer hitch of the trailer at a front end of the trailer so that debris is channeled from the ends during forward movement of the trailer.

7. The agricultural trailer and the industrial tire as set forth in claim 4 wherein each of the lugs defines a wall that extends at an angle of between approximately 20 and 25 degrees with respect to a radial line of the tire.

* * * * *